United States Patent
Schneck

[11] Patent Number: 5,849,382
[45] Date of Patent: Dec. 15, 1998

[54] TUBING FOR SYSTEMS IN AUTOMOTIVE VEHICLES AND A METHOD OF MANUFACTURING THE SAME

[75] Inventor: Werner Schneck, Speyer, Germany

[73] Assignee: ITT Automotive Europe GmbH, Frankfurt, Germany

[21] Appl. No.: 679,121

[22] Filed: Jul. 12, 1996

[51] Int. Cl.$^6$ ............................. B29D 22/00; B32B 15/08
[52] U.S. Cl. ......................................... 428/36.91; 428/461
[58] Field of Search .............................. 428/36.91, 461; 138/137

[56] References Cited

U.S. PATENT DOCUMENTS

| | | | |
|---|---|---|---|
| 3,503,823 | 3/1970 | Richart et al. | 156/244 |
| 5,026,451 | 6/1991 | Trzelieski et al. | 156/244.27 |

FOREIGN PATENT DOCUMENTS

| | | |
|---|---|---|
| 0132218 | 5/1984 | European Pat. Off. . |
| 3820615 | 6/1988 | Germany . |
| 59-012846 | 1/1984 | Japan . |
| 5138812 | 6/1993 | Japan . |
| 6246811 | 9/1994 | Japan . |

*Primary Examiner*—Eggerton A. Campbell
*Attorney, Agent, or Firm*—J. Gordon Lewis; Thomas N. Twomey

[57] ABSTRACT

Tubing for a brake system, fuel system or hydraulic system in automotive vehicles which includes an inside steel tube having an outer surface, a zinc coating layer on the outer surface, chromated layer overlying the zinc coating layer and a plastic jacket layer overlying the chromated layer wherein the plastic jacket layer is composed of a polyamide on the chromated layer, the polyamide preferably being laurinlactam and the chromated layer preferably being olive-colored. The method of tubing manufacture including the steps of heating a steel tube having an outer surface with the zinc coating and chromate present thereon to an elevated temperature; the elevated temperature being within about ±30° C. of the extrusion temperature of polyamide material to be applied to the tube; extruding polyamide material onto the surface of the heated tube; and quenching the tube in a liquid bath after the polyamide has been applied.

23 Claims, 1 Drawing Sheet

TUBING FOR SYSTEMS IN AUTOMOTIVE VEHICLES AND A METHOD OF MANUFACTURING THE SAME

FIELD OF THE INVENTION

The present invention relates to a tubing for a brake system, fuel system or hydraulic system in automotive vehicles including an interior steel tube having an exterior zinc-coated surface, a chromate layer overlying the zinc-coated surface and a plastic jacket layer, and a method of manufacture for a tubing of this type. Tubing for brake or fuel systems in automotive vehicles having the aforementioned features disclosed in German Patent No. 38 20 615 issued Dec. 21, 1989 and U.S. Pat. No. 4,853,297 also to Takahashi. Brake lines and fuel lines, as well as other lines (for example, lines for hydraulic adjustment devices) are sensitive to damage occurring in the operation of automotive vehicle but must offer long-lasting resistance to traffic stress, for years and more. Extended application durability requires that the tubing exhibit wear resistance, maximum reliability in operation with respect to breaking, rupture or bursting caused by internal pressure, stone impact resistance and high corrosion resistance, in particular, against outside effects on the road, such as road salt. Tubing with metal tubes made of steel are nowadays used to a great extent. Double-wrapped steel tubing is especially suitable for brake lines, while single-wall steel tubing having a longitudinal welding seam is used for fuel lines, for example.

Prior art tubing having an internal steel tube which is currently employed in large volume are generally prepared by a manufacturing process in which the tubes are zinc-coated on their outside for corrosion prevention in a first manufacturing step. This can be accomplished by galvanization, but also by liquid zinc coating. In a second manufacturing step, an outside chromium coating is applied to the zinc-coated pipe by immersing it in a chromating bath. The chromium coating serves to improve the corrosion protection of the zinc coating. A large number of chromating methods can be used, such as olive-coloured chromating, yellow-coloured chromating and transparent chromating. The methods of various types of chromated galvanized steel parts, in particular the olive-coloured chromating method, are described in DIN 50941 (see table 1: chromating treatment groups). Further, the chromatings of zinc-coated steel parts are listed under 4.1.2 and 4.1.3 in the delivery specifications TL-VW 217 of Volkswagen.

To provide additional corrosion protection to the chromated steel tubing particularly against road humidity effects due to road salt, stone impacts, etc., the zinc-coated and chromated steel tubing is coated with a plastic jacket. The plastic material employed should be corrosion-resistant and have a sufficiently high strength and wear resistance. However, in situations where the outside plastic layer is damaged or loosened by stone impact, the chromated layer can be easily damaged the zinc in the outside zinc coating, depending on its thickness, will become dissolved over a period of several years until the inside steel tube is exposed. So-called white blisters on the zinc and finally red rust of the steel can be seen after the zinc coating is used up.

Therefore, the plastic jacket should adhere properly on the inside pipe and should not loosen due to mechanical stress or any local damage of the plastic jacket. Otherwise, the inner steel tube will corrode. Such corrosion is impossible to detect from the outside of the tubing line. The plastic material used should be corrosion-resistant, not only against outside influences such as road salt, road contaminants, or the like, but also against liquids used in the field of automotive vehicles such as fuel, brake fluid and battery acid. Further, the plastic material is required to have a determined temperature resistance, especially as regards the elevated temperatures in the engine compartment.

Thus, a general object is to achieve double safety in operation. In case the first safety measure fails, i.e., using a maximum long-wearing plastic jacket, the remaining metal core, as a second safety measure, is required to remain corrosion-resistant for many years, for example, for at least five years. This requirement can be fulfilled with externally zinc-coated and chromated steel pipes, despite the rusting susceptibility of steel.

In some aspects, steel is superior to other metals such as aluminum, for example. Double-wrapped steel tubing prepared pursuant to DIN 74234 exhibits superior properties to aluminum tubing in areas which are of vital importance especially with respect to brake lines. Elevated burst resistance levels and fatigue strength under vibratory stresses are particularly significant. Additional properties which will be referred to hereinbelow and also in the numerical tables are also important. Another important point is the elastically flexible installation of tubing and ease of bending the tubing in the assembly without risk of damage to the tube during installation. Plastic-jacketed aluminum tubes (their application has already been discussed in the above-mentioned range of application of tubes for automotive vehicle systems (see also leaflets of Hydro Aluminum Heat Transfer a.d. Postboks 50, Hydrovey 6, DK 6270 Tonder, titled "HYCOT™ HYDRO ALUMINUM Automotive") have thus far only rarely been used in practice. To satisfy extreme corrosion protection demands, Porsche and Audi employ particularly expensive copper-based tubes including roughly 10% Nickel and a small amount of iron. Copper tubes which formerly were frequently used, are scarcely used nowadays.

For many years, the plastic material used for as a plastic jacket layer has been composed mainly of polyvinylfluoride (PVF), a duroplastic material. This plastic material has a very good corrosion resistance qualities and exhibits good temperature resistance. Because PVF does not permit direct dissolution in solvents, it is normally ground and, in combination with a solvent or base material, prepared as a dispersion in a dispersion bath. To apply the plastic material, the zinc-coated and chromated steel tube is immersed into the dispersion bath and wetted by the liquid. Subsequently, the solvent dries, leaving a roughly 15 $\mu$m thick plastic layer.

Various drawbacks exist in the use of PVF as the plastic jacket. Because of environmental concerns, the evaporating solvent must be collected. Thicker plastic layers can only be achieved through a number of working steps, because drips or bulgings are caused when applying large quantities of liquid to the tube. The result is an asymmetric plastic coating of the tube. Further, PVF, at a price of approximately DM 27,—per liter dispersion bath, (80% of the bath being solvents), is very expensive as a raw material. Because PVF, with this type of coating, has a relatively thin scaly texture, it is impossible to achieve a particularly high degree of strength and wear resistance. This results in reductions the stone impact resistance in particular.

However, PVF can be applied to an externally zinc-coated steel tube and provides a very good adhesion when the zinc-coated steel tube is chromated. In particular, the high adhesion ability of PVF on an olive-coloured chromated coating explains the wide circulation of this plastic material.

Beside steel tubes, aluminum tubes have been offered as plastic-jacketed tubing in automotive vehicles for at least ten years in which the tube is prepared by extruding the plastic jacket onto the pipes. The aluminum tubes can be drawn in one seamless wall or in a single wall with a longitudinal welding seam. In the leaflet from Hüls AG titled "Pipes and Pressure Hoses made of VESTAMID®, leaflet No. 42.01.011, second edition, October 1991, page 38, a method is described wherein a polyamide (i.e. the so-called polyamide 12 with the trade name "VESTAMID Z4881") is extruded onto pretreated aluminum tubes to make tubing which is specially adapted for application in the manufacture of automotive vehicles. However, the previously mentioned shortcomings of plastic-coated aluminum tubes such as a low burst strength and limited flexibility, still remain.

Tubes for brake systems, fuel systems or hydraulic systems in automotive vehicles are mass produced products having limited modification parameters. Therefore, an object of the present invention is to provide a tubing with a plastic-jacketed steel tube (and, thus a high degree of burst strength and fatigue strength under vibratory stresses in double-wrapped steel pipes) for the above-mentioned applications in the field of automotive vehicles, and a method of manufacturing a pipe of this type which is durably corrosion-resistant, temperature-resistant and wear-resistant and, in addition, is resistant to stone impacts and has sufficient adhesion on the steel tube. German patent No. 38 20 615 (U.S. Pat. No. 4,853,297 to Fochs) which was previously referred to with respect of the preamble of claim 1, represents an improvement of the relevant state of the art-cited therein by using a yellow-coloured chromate film, to which an intermediate layer composed of an epoxy resin is applied in an immersion process or spraying process. The intermediate layer is, then, coated with a polyvinylfluoride film in an immersion process.

With regard to steel tubes, the application of plastic layers has not been carried out by extrusion because of disadvantages with respect to corrosion prevention and bending of the plastic-jacketed tube due to the reduced adhesion ability of the so applied plastic material. Also, the increased strength of the plastic layer as applied by extrusion methods has shortcomings in the bonding technology between the plastic and metal materials in such tubes employed in automotive vehicles.

SUMMARY OF THE INVENTION

The present invention is directed to tubing for a brake system, fuel system or hydraulic system in automotive vehicles in which the tubing includes an interior steel tube having an outer surface, a zinc coating layer on the outer surface of the steel tube, a chromate layer overlaying the zinc coating layer and a plastic jacket layer overlying the chromate layer, wherein the plastic jacket layer is composed of an extrudible thermoplastic material selected from the group consisting of polyamide. The chromate material is preferably composed of olive chromate material.

The tubing of the present invention is manufactured by a process comprising the following steps:

heating a steel tube having an outer surface, a zinc coating layer on the outer surface and a chromate layer overlying the zinc coating layer to a temperature essentially equal to an extrusion temperature of a thermoplastic material;

extruding the thermoplastic material on to the heated steel tub in overlying relationship to the chromate layer wherein the thermoplastic material is selected from the group consisting of polyamides; and quenching the tube in a liquid bath after the extrusion step.

DESCRIPTION OF THE DRAWING

In the following drawings, like reference numerals refer to like elements throughout the various views, wherein.

PREFERRED EMBODIMENT

Figure 1:
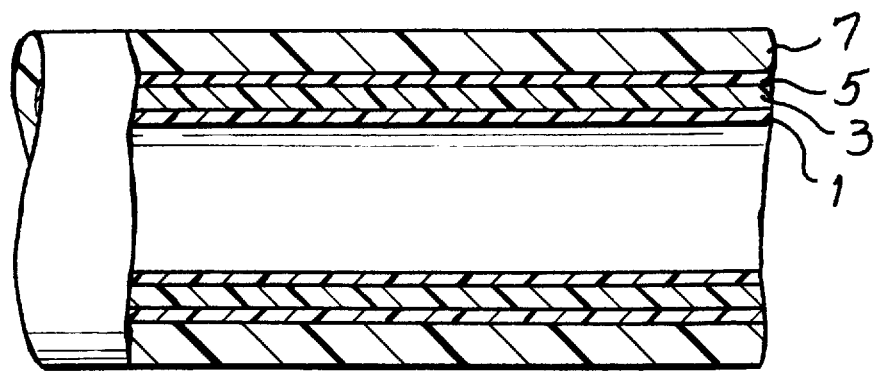
FIG. 1 is a cross-sectioned view taken through tubing according to the first embodiment of the present invention.

The present invention is predicated on the unexpected discovery that extruded polyamide exhibits sufficient adhesion on a chromated layer of the outside zinc coating of a steel tube. The thickness of the extruded plastic layer makes it very resistant to external damages without the lower adhesive ability previously expected in such situations.

Heretofore, it was believed that only thermoplastic materials such as PVF applied as a liquid in a solvent bath would have sufficient adhesion with a chromated layer of an externally zinc-coated steel pipe. In the process and article of the present invention, application of the plastic jacket by extrusion eliminates the need for solvents. Thus, the process of the present invention is environment-friendly and inexpensive with respect to compliance with environment protection regulations. The plastic jacket layer of a tubing prepared according to the present invention can be achieved at low cost and in one working operation at a thickness that is especially durable stone impact resistance greater than that which has been achieved to date. Despite all efforts to this effect, such stone impact resistance was unknown in plastic-jacketed steel tubes prior to this invention. It has been found that a plastic jacket layer wall thickness of under 100 μm does not provide the tubing with sufficient resistance to be considered genuine stone impact resistance.

Surprisingly, the corrosion resistance quality criteria achieved for the tubing of the present invention which, so far, only the above-mentioned very expensive copper base alloy with roughly 10% nickel and a small amount of iron was achieved heretofore. Thus, the novel combination of elements according to the present invention results in a low-cost product of highest quality for a range of application which is, in many respects, critical. As regards the mass product at issue, failure of which may even threaten life, this is an astonishing technological advance.

The thermoplastic material employed in the plastic jacket layer of the tubing of the present invention is preferably a polyamide suitable for application to an olive-coloured chromated layer of the zinc-coated tubing. Such polyamides are relatively inexpensive and adhere well on olive-coloured chromated layers. Polyamide has a higher strength and wear resistance than previously used PVF plastic materials. Good adhesion has been achieved especially in the tubing of the present invention by employing a laurinlactam based polyamide. Suitable material is sold, for example, by Hüls under the trade name VEDSTAMID L2140 or VESTAMID Z4881. Such material also commonly called polyamide 12.

Advantageously, good adhesion characteristics are also ensured when a type of bonding layer of primer is provided between the olive-coloured chromated layer and the plastic jacket layer. It is also within the purview of the present invention to provide for the application of a special adhesion bond layer on, or instead of, the chromated layer. The present invention also encompasses the use of an interlocking or compounded layer in the transition area between the olive-coloured chromated layer and the plastic jacket layer.

In the manufacturing method of the present invention, the tube to be coated is roughly heated to the temperature of the extruded polyamide, and the coated tubing is subsequently quenched in a water bath. Especially tubing having interlocked and compounded layer interposed between the olive-chromated layer and the plastic jacket layer can be prepared by manufacturing methods of the present invention. The particular embodiments of the present invention will be explained hereinbelow with reference to the accompanying Figures of the drawing.

FIG. 1 shows tubing in which a zinc layer 3 is applied to a steel tube 1. The steel tube is either a double-wrapped steel tube pursuant DIN 74234, corresponding to ISO-standard 4038, or a single-wall steel tube pursuant DIN 2393. For manufacturing technology reasons, a thin copper filler metal layer may remain on the outside surface of a double-wrapped steel pipe. This remaining copper layer may be undesirable for the subsequent zinc-coating operation, it does not present any principal problems for the process of the present invention. The steel tube employed has a wall thickness of 0.5 to 1 mm for single-wall steel tubes with a longitudinal welding seam and for double-wrapped steel tubes. The external diameter of the uncoated double-wrapped steel tube ranges from 3.2 to 12 mm, while the external diameter of the uncoated single-wall steel tube with a longitudinal welding seam ranges from 3.2 to 12 mm. When the tube is to be employed in a brake line, the external diameter is preferably 4.75 mm or 6.0 mm, when employed as a fuel line, the external diameter of the uncoated tube is 6.0 mm, 8.0 mm or 10 mm, preferably, it is 8.0 mm.

After manufacture, double-wrapped steel tubes prepared according to DIN 74234 are highly polished and copper-plated on the inside and outside. Manufactured from double-faced electro-copper steel strips, the tubes are molded and hard-soldered under protective gas using no filler material of any kind. The copper coating necessary for the hard-soldering process has a thickness of roughly 3 $\mu$m. The surface of such double-wrapped steel tubes is smooth, free of flakes or any drawing or rolling flaws (as may be caused on drawn pipes), and without scales. With elongated on-directional tube lengths, preferably, the following values apply for various outside diameters of double-wrapped steel tubes:

| tube outside diameter (mm) | 4.75 | 5.0 | 6.0 | 8.0 | 9.5 | 10.0 |
|---|---|---|---|---|---|---|
| bursting pressure (bar) | 1100 | 940 | 800 | 570 | 470 | 450 |
| maximum internal operating pressure (bar) | 410 | 380 | 320 | 230 | 190 | 180 |
| tensile strength $R_m$ (N/mm$^2$) | 310–410 | | | | | |
| yield point $R_e$ (N/mm$^2$) | 290 (max.) | | | | | |
| Bursting limit $L_0$ pursuant DIN 50135 | 11.3 Fo:min, 25% | | | | | |
| socket | 20% of internal diameter | | | | | |

Zinc coating may be accomplished by liquid galvanization (hot galvanization) or, preferably, by electro-galvanization. In an electro-galvanization process, the thickness of the zinc layer amounts to 10 to 30 $\mu$m, preferably 15 or 25 $\mu$m, while layer thicknesses of up to 200 $\mu$m can be reached in liquid galvanization processes. As is known, a transition layer (not shown) is produced between the steel pipe and the zinc layer in liquid galvanization.

The olive-coloured chromated layer 5 is produced on the zinc layer in any suitable known fashion by immersing the zinc-coated pipe in an olive chromating bath. Chromates are produced on the zinc layer and provide corrosion protection. The entire thickness of the zinc layer and the chromate layer is roughly 15 $\mu$m or 25 $\mu$m.

In the last working step, a polyamide layer 7 is extruded onto the chromate layer, the thickness of layer 7 being roughly 100 to 500 $\mu$m, preferably roughly 125 to 175 $\mu$m. Even more preferably layer thickness of roughly 150 $\mu$m is applied.

Figure 2:
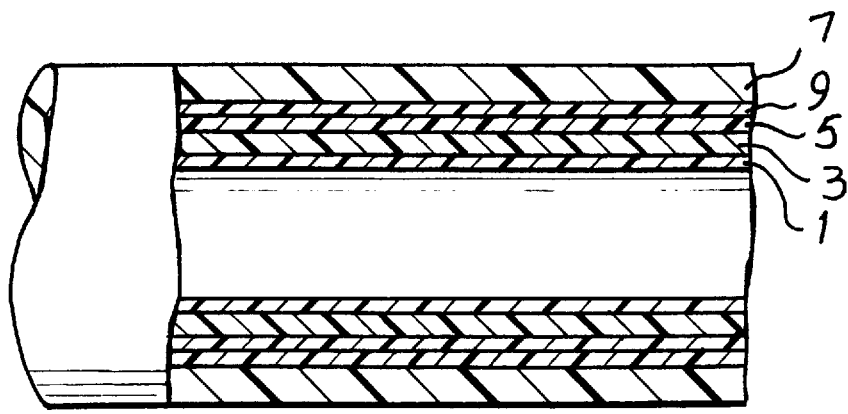
FIG. 2 is a cross-sectional view taken through tubing according to the second embodiment of the present invention.

FIG. 2 shows a tube where an interlocked or compounded layer 9 is formed between the plastic jacket layer 7 and the olive-coloured chromated layer 5. Such an interlocked or compounded layer is found in the micrograph especially when using polyamide 12 under the trade name VESTAMID L2140 or VESTAMID Z4881 from Hüls AG.

In the process of the present invention, when extruding the polyamide layer on the tube, the tube is heated approximately to the temperature of the polyamide to be extruded which may be in the range from 240° to 260° C. approximately. This heating step permits a particularly good adhesion of the polyamide on the olive-coloured chromated layer to be achieved. The mentioned adjustment of the pipe temperature to the temperature of the polyamide to be extruded does not mean a strictly identical temperature. However, at least an approximation of temperatures is aimed at in order to avoid subsequent peeling of the plastic jacket layer from the tube, which occurs during extrusion on a cold pipe. Normally, the difference in temperature during the temperature adjustment will be a few degrees at the most, it at all, up to roughly ±20° C. or up to roughly ±30° C. Even greater differences in temperatures during extrusion may be possible.

It may occur that during heating the chromated zinc-coated steel pipe, the chromate layer is roughened to a certain extent. This roughened surface will provide enhanced bonding with the polyamide extruded on it that is particularly resistant to peeling and generally adhesive by forming the mentioned interlocked or compounded layer. After the pipe treated has been chilled in a water bath or any other liquid bath, the pipe will have a sufficient mechanical resistance for further processing, for example, for conveyance on rollers.

I claim:

1. Tubing for use in automotive vehicles, the tubing comprising:

an interiorly positioned steel tube having an inner surface and an outer surface, the steel tube having a wall thickness of 0.5 to 1 mm;

an outwardly oriented zinc coating layer overlying the outer surface of the steel tube, the zinc coating layer having a thickness in the range from 10 $\mu$m to 30 $\mu$m;

an outwardly oriented olive chromate layer overlaying the zinc coating layer;

a plastic jacket layer extruded on, enclosing, and overlaying the olive chromate layer, wherein the plastic jacket layer is a polyamide, the plastic layer having a thickness in a range from 100 to 500 $\mu$m.

2. Tubing as defined in claim 1, wherein the improvement further comprises the steel tube is double wrapped.

3. Tubing as defined in claim 1, wherein the improvement further comprises that the steel tube has a single-wall design with a longitudinal welding seam.

4. Tubing as defined in claim 1, wherein the improvement further comprises that the polyamide is a laurinlactam based product.

5. Tubing as defined in claim 1, further comprising:

an interlocked compound layer interposed in a transition area between the olive-coloured chromate layer and the plastic jacket layer.

6. Tubing as defined in claim 1, wherein the plastic jacket layer thickness is in the range from 125 to 175 $\mu$m.

7. Tubing as defined in claim 6, wherein the plastic jacket layer thickness is 150 $\mu$m.

8. Tubing as defined in claim 3, wherein the uncoated single-wall steel tube has an outside diameter in the range between 3.2 and 12 mm.

9. Tubing as defined in claim 2, wherein the outside diameter of uncoated double-wrapped steel tube is in the range from 3.2 to 10.0 mm.

10. Tubing as defined in claim 1, wherein the tubing is employed as a brake line and has an outside diameter for the brake line of 4.75 mm.

11. Tubing as defined in claim 1, wherein the tubing is employed as a fuel line and has an outside diameter for the fuel line of 6.0 mm.

12. Tubing as defined in claim 1, wherein the tubing is employed as a fuel line and has an outside diameter of 8.0 mm.

13. Tubing as defined in claim 1, wherein the thickness of the outside zinc coating is 15 $\mu$m.

14. A method of manufacturing tubing for automotive vehicles as set forth in claim 1 comprising the steps of:

heating a steel tube with an outwardly oriented surface having a zinc coating on the outwardly oriented surface and an olive chromated layer overlaying the zinc coating heated to an elevated temperature; and extruding thermoplastic material onto the heated steel tube at an extrusion temperature wherein the elevated temperature of the steel tube is approximately equal to the extrusion temperature of the thermoplastic material, the thermoplastic material having a thickness between about 100 to 500 $\mu$m; and quenching the tube in a liquid bath after the extrusion step.

15. The method of claim 14 wherein the thermoplastic material is a polyamide.

16. The method of claim 14 wherein the thermoplastic material is laurinlactum.

17. The method of claim 14 wherein the steel tube is heated to an elevated temperature in a range within about 30° C. of the extrusion temperature of the thermoplastic material.

18. The method of claim 14 wherein the steel tube is heated to an elevated temperature in a range within about 20° C. of the extrusion temperature of the thermoplastic material.

19. The tubing of claim 14 wherein the thickness of the zinc coating layer is between about 10 $\mu$m and about 30 $\mu$m.

20. The tubing of claim 14 further comprising a compound layer interposed in a transition layer located between the chromated layer and the plastic jacket layer.

21. The tubing of claim 9 wherein the tubing is employed as a brakeline and has an outside diameter of 6.0 mm.

22. The tubing of claim 9 wherein the tubing is employed as a fuel line and has an outside diameter of 10 mm.

23. The tubing of claim 9 wherein the tubing is employed as a fuel line and has an outside diameter of 8.0 mm.

* * * * *